United States Patent [19]
DeLong

[11] Patent Number: 4,619,679
[45] Date of Patent: Oct. 28, 1986

[54] GAS PROCESSING

[75] Inventor: Bradley W. DeLong, Bartlesville, Okla.

[73] Assignee: Phillips Petroleum Company, Bartlesville, Okla.

[21] Appl. No.: 666,068

[22] Filed: Oct. 29, 1984

[51] Int. Cl.$^4$ ................................................ F25J 3/00
[52] U.S. Cl. ............................................ 62/11; 62/38; 62/39
[58] Field of Search ............... 62/38, 39, 9, 11, 36, 62/19, 21, 37

[56] References Cited

U.S. PATENT DOCUMENTS

| | | | |
|---|---|---|---|
| 2,591,658 | 4/1952 | Haringhuizen | 62/175.5 |
| 3,001,373 | 9/1961 | Du Bois Eastman et al. | 62/17 |
| 3,021,682 | 2/1962 | Baker et al. | 62/17 |
| 3,095,294 | 6/1963 | Knapp et al. | 62/31 |
| 3,097,940 | 7/1963 | Houston | 62/12 |
| 3,565,784 | 2/1971 | Schlinger et al. | 208/11 |
| 3,617,472 | 11/1971 | Schlinger et al. | 208/11 R |
| 3,626,705 | 12/1971 | Knapp et al. | 62/23 |
| 3,796,059 | 3/1975 | Bankikiotes | 62/39 |
| 3,891,403 | 6/1975 | Weil et al. | 48/197 R |
| 3,891,404 | 6/1975 | Weil et al. | 48/213 |
| 3,929,615 | 12/1975 | Linden et al. | 208/11 |
| 4,110,359 | 8/1978 | Marion | 260/449.5 |
| 4,217,759 | 8/1980 | Shenoy | 62/27 |
| 4,242,875 | 1/1981 | Schaefer | 62/23 |
| 4,272,270 | 6/1981 | Higgens | 62/24 |
| 4,356,014 | 10/1982 | Higgins | 62/39 |

FOREIGN PATENT DOCUMENTS 1057020 2/1967 United Kingdom .

OTHER PUBLICATIONS

"New Separation Tool . . . ", McKinley, Dec. 1956, Petroleum Refiner, pp. 201, 206, vol. 35, No. 12.

Primary Examiner—Frank Sever
Attorney, Agent, or Firm—French and Doescher

[57] ABSTRACT

A cryogenic hydrogen purification system is disclosed which produces low and high BTU substitute natural gas byproduct from a feed stream containing substantial carbon monoxide concentration. The required process cooling is provided by a pair of gas expanders. The purified hydrogen stream can be recycled to a hydroretort. The low BTU substitute natural gas stream contains most of the carbon monoxide. The high BTU natural gas stream forms suitable feed for a hydrogen plant.

11 Claims, 1 Drawing Figure

GAS PROCESSING

BACKGROUND OF THE INVENTION

In one aspect, the invention relates to the separation of the components of a gas stream. In another aspect, the invention relates to the separation of a high purity stream of hydrogen gas from a gas stream. In still another aspect, the invention relates to the separation and recycling of a high purity hydrogen stream from and to a hydroretort.

"Hydroretorting" is retorting which is conducted in the presence of added hydrogen. Retorting is one method by which carbonaceous material, especially oil shale, can be upgraded to more valuable predominantly liquid hydrocarbon products. It has been found that conducting the retorting of certain oil shales in the presence of added hydrogen provides increased yield and product quality.

To promote the thermal efficiency of the retorting process, it is desirable to combust residual carbon from the retorted shale using oxygen containing gas to provide the heat for driving the retorting process. Leakage of combustion products from the combustion zone to the retorting zone results in combustion products being recovered from the retorting zone. The presence of combustion products such as carbon monoxide causes problems in the purification and recycling of hydrogen to the retort.

Hydrogen recovery is more important in a hydroretorting process than is common for many hydrogen purifiers because the hydroretorting process is a large consumer of hydrogen. Any loss of hydrogen must be made up by converting hydrocarbon retort product to hydrogen and carbon dioxide, an expensive process.

OBJECTS OF THE INVENTION

It is an object of this invention to provide an apparatus and process which result in high hydrogen recovery of high purity from a hydrogen containing gas stream.

It is another object of this invention to provide an apparatus and process for hydrogen recovery which requires no external refrigerant.

It is yet another object of this invention to provide a process for the recovery and recycle of hydrogen to and from a hydroretort which is simple and easily controlled.

It is another object of this invention to provide an apparatus and process for the production of two compositionally different substitute natural gas streams, a low pressure low BTU fuel gas stream and a relatively high pressure high BTU stream suitable for process use, e.g., reforming.

SUMMARY OF THE INVENTION

In one aspect, there is provided a process for providing a high purity hydrogen stream. An off-gas from a hydroretort means containing predominantly hydrogen and small amounts of methane and ethane and carbon monoxide is introduced into a separation means to separate the off-gas stream into a hydrogen first stream, a low BTU gas second stream containing carbon monoxide and a high BTU predominantly hydrocarbon third stream containing predominantly $C_1$ to $C_4$ hydrocarbons and a small amount of carbon monoxide. The third gas stream is fed from the separation means to a reformer means to provide the makeup hydrogen for the hydroretort. By separating out the carbon monoxide from the feed to the reformer process equilibrium can be shifted to favor hydrogen production.

In another aspect of the invention, hydrogen for a hydroretort can be provided from a dry, relatively low purity hydrogen gas first stream by cooling the first stream by indirect heat exchange in addition to cooling the first stream by expansion. With sufficient cooling the first stream is divided into a gaseous second stream which is hydrogen enriched and a liquid third stream which is hydrogen depleted. The expansion supplies the first portion of the cooling required to divide the first stream. The second stream is passed into indirect heat exchange relationship with the first stream to provide a second portion of the cooling required to divide the first stream. The third stream is passed into an indirect heat exchange relationship with the first stream to provide a third portion of the cooling required to divide the first stream. By the indirect heat exchange, the third stream is heated sufficiently to be divided into a gaseous fourth stream and a liquid fifth stream. The fourth stream is then passed through a second expander for cooling and the cooled fourth stream is then passed into indirect heat exchange relationship with the first stream to provide a fourth portion of the cooling required to separate the first stream. The fifth stream is passed into indirect heat exchange relationship with the first stream to provide a fifth portion of cooling required to divide the first stream. Where the first stream has issued from a hydroretort and is at a sufficiently high pressure, no external refrigeration is required in accordance with the invention.

In yet another aspect of the invention, there is provided an apparatus comprising a hydroretort means for producing an effluent off-gas containing carbon monoxide and hydrogen. A separation means is provided for separating the effluent off-gas into: (a) a high purity hydrogen gas stream; (b) a low BTU gas stream; and (c) a high BTU gas stream. A first conduit connects the hydroretort means with the separation means. A second conduit means connects the separation means and the hydroretort for passing the high purity hydrogen gas stream back to the hydroretort. A reformer is provided for converting the high BTU gas stream into a predominantly hydrogen stream. A third conduit means connects the separation means with the reformer for feeding the high BTU gas stream from the separation means to the reformer. A fourth conduit means connects the reformer with the hydroretort for passing hydrogen from the reformer to the hydroretort.

In yet another aspect of the present invention, an apparatus for separating the components of a gas stream comprises a means for passing two fluids in indirect heat exchange relationship and a first expander means for reducing the pressure on a fluid. A first conduit means connects the means for passing two fluids in indirect heat exchange relationship with the first expander means. A first vessel provides a means for phase separating a liquid and a gas. A second conduit means connects the first expander with the first vessel. A third conduit means connects an upper portion of the first vessel with the means for passing the two fluids in indirect heat exchange relationship. A second vessel provides a means for phase separating a liquid and a gas. A fourth conduit means connects the lower portion of the first vessel with a second vessel and passes through the means for passing two fluids in indirect heat exchange relationship. A fifth conduit means is connected to a lower portion of the second vessel and passes through a portion of the means for passing two fluids in indirect heat exchange relationship. A second expander is provided for reducing the pressure on a fluid. A sixth conduit means connects an upper portion of the second vessel with a second expander and a seventh conduit means is connected to the second expander and passes through a portion of the means for passing two fluids in indirect heat exchange relationship.

BRIEF DESCRIPTION OF THE DRAWING

The FIGURE schematically illustrates certain features of one embodiment of the present invention.

DETAILED DESCRIPTION OF THE INVENTION

Figure 1:
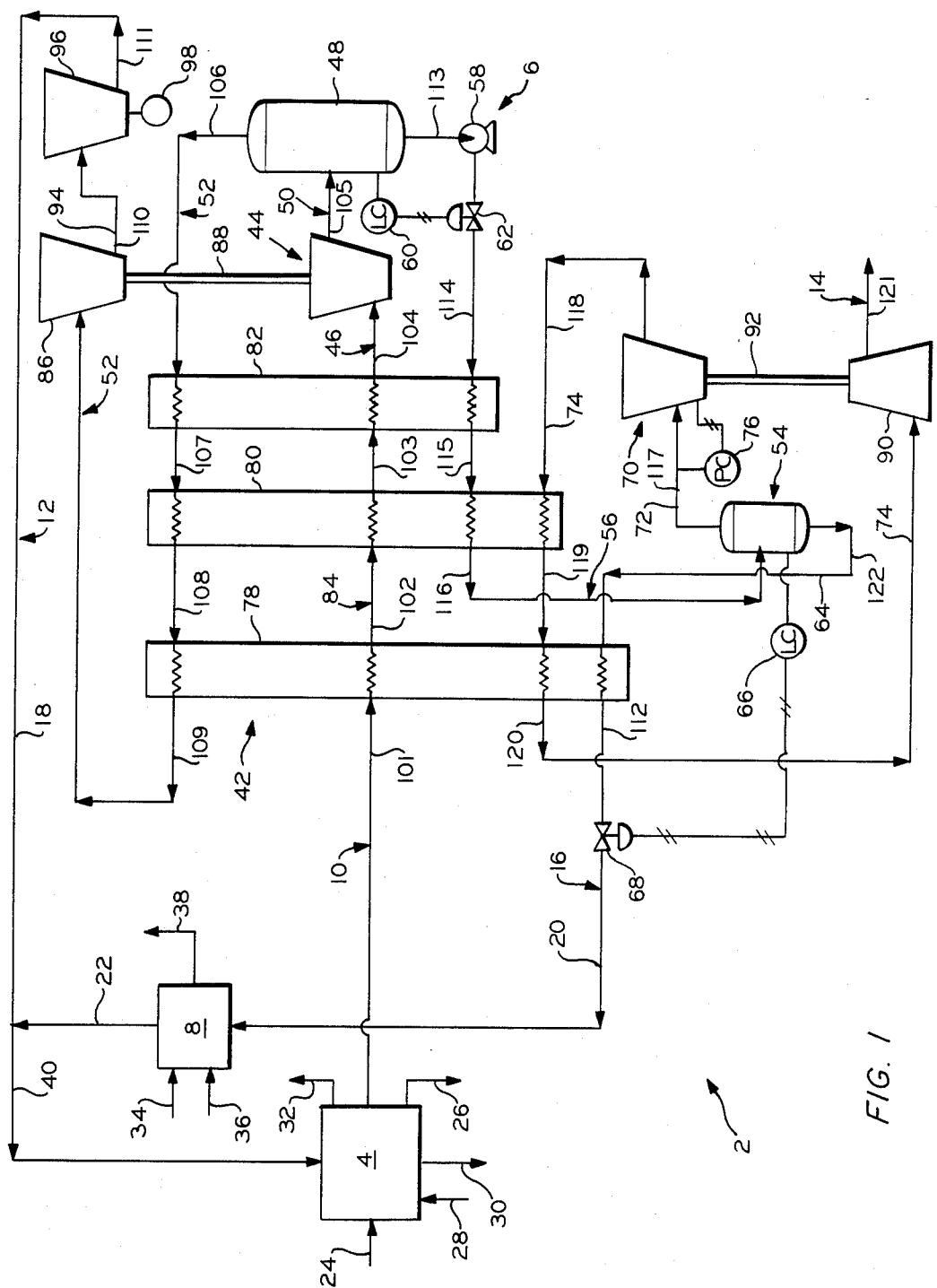

In accordance with certain aspects of the present invention, an apparatus 2 comprises a means 4 for carrying out a hydroretorting process; a means 6 for separating components from a gas stream; and a means 8 for reforming hydrocarbons to provide hydrogen make-up for the hydroretort. A conduit means 10 connects the retort means 4 with the separation means 6. The separation means 6 divides the contents of the conduit means 10 into a high purity hydrogen gas stream 12, a low BTU gas stream 14 and a high BTU gas stream 16. A conduit means 18 can be provided to connect the separation means 6 with the hydroretort 4 for passing the high purity hydrogen gas stream to the hydroretort. A conduit means 20 can be provided to connect the separation means 6 with the reformer means 8 for feeding the high BTU gas stream to the reformer means 8. A conduit means 22 can be provided for connecting the reformer means 8 with the hydroretort 4 for passing hydrogen from the reformer means 8 to the hydroretort means 4.

Preferably, the hydroretort 4 is a unit which receives a stream of crushed oil shale 24 and pyrolyzes the received oil shale at a temperature in the range of from about 800° to about 1200° F. in the presence of added hydrogen to produce, after suitable cooling and separation, a liquid shale oil stream 26. More preferably, the pyrolysis zone is maintained in the range of 850°–950° F. The pressure in the oil hydroretort 4 generally ranges from about 250 to about 2500 psig and the hydrogen partial pressure ranges from about 20 to about 2000 psig. More preferably, total pressure is between 500 and 1500 psig and hydrogen pressure is between 500 and 1000 psig. Preferably, the oil shale is of the type commonly found in the Eastern United States known as Devonian oil shale because there is greater economic incentive to hydroretort Devonian oil shale than shale, for example, from the Green River formation although the present invention is also applicable to Green River and oil shales from other sources as well. Residual carbon remaining on the oil shale after pyrolysis is combusted in the hydroretort 4 by combusting the residual carbon with a stream 28 of oxygen containing gas such as oxygen. A spent shale stream 30 is withdrawn from the hydroretort 4. Flue gas is withdrawn via line 32. The line 10 withdraws a gaseous effluent from the hydroretorting unit 4 which contains predominantly hydrogen and small amounts of methane and ethane and carbon monoxide.

The reformer 8 can use catalytic steam reforming, non-catalytic steam reforming, etc., but preferably uses the well known partial oxidation process for making synthesis gas which includes hydrogen, carbon monoxide, carbon dioxide and water vapor resulting from the reaction of steam, oxygen and a suitable hydrocarbon. The hydrocarbon is introduced via the line 20. Steam can be introduced into the zone 8 via a line 34. Oxygen can be introduced into the zone 8 via a line 36. After separation procedures, the hydrogen is withdrawn from the reformer via the line 22. The carbon dioxide, carbon monoxide and water vapor are withdrawn via the line 38. The hydrogen carried by the line 22 can be combined with the hydrogen carried by the line 18 and introduced into the hydroretort 4 via a line 40. Where the hydrogen introduced into the hydroretort 4 by the line 40 is of high purity, the hydrogen partial pressure in the retort can be maintained nearer that of the total retort pressure.

In accordance with another aspect of the present invention the separator means 6 is formed in the following manner. The separator 6 comprises a means 42 for passing fluids, i.e., two or more, in indirect heat exchange relationship. A first expander means 44 is provided for reducing the pressure on a fluid. A first conduit means 46 connects the means 42 with the means 44. A first vessel 48 provides a means for the phase separation of a liquid and a gas. A second conduit means 50 connects the expander means 44 with a vessel 48. A conduit means 52 connects an upper portion of the vessel 48 with the means 42 for passing the two fluids in indirect heat exchange relationship. A second vessel 54 provides a means for phase separating a liquid and a gas. A conduit means 56 connects a lower portion of the vessel 48 with the vessel 54. A pump 58 can be disposed in the conduit means 56 to cause fluid flow from the vessel 48 to the vessel 54. A level controller 60 can be coupled to the vessel 48 and a valve 62 disposed in the line 56 for controlling the liquid level in the vessel 48. The conduit means 56 passes through the means 42 for passing two fluids in indirect heat exchange relationship. A conduit means 64 is connected to a lower portion of the vessel 54 and also passes through a portion of the means 42 for passing two fluids in indirect heat exchange relationship. Preferably, the conduit means 64 provides the stream 16. If desired, a level controller 66 can be coupled to the vessel 54 and a valve 68 positioned in line 64 to provide for control of liquid level in the vessel 54. A second expander means 70 is provided for reducing the pressure on a fluid. A conduit means 72 connects an upper portion of the second vessel 54 with the expander 70. A conduit means 74 leads from the expander 70 and passes through a portion of the means 42 for passing two fluids in indirect heat exchange relationship. A pressure controller 76 can be coupled to the line 72 and the expander 70 to control the degree of expansion by the expander 70.

In a preferred embodiment of the invention the means 42 for passing two fluids in indirect heat exchange relationship comprises a first heat exchanger 78, a second heat exchanger 80, and a third heat exchanger 82. Exchangers 78, 80 and 82 may be plate-type cryogenic aluminum alloy exchangers. A conduit means 84 passes through the first heat exchanger 78, the second heat exchanger 80 and the third heat exchanger 82 and connects the conduit means 10 with the conduit means 46. The conduit means 52 connected to the upper portion of the vessel 48 passes in a countercurrent fashion with respect to the contents of the conduit 84 through the third heat exchanger 82, the second heat exchanger 80, and the first heat exchanger 78. The conduit means 56 connected to the lower portion of the vessel 48 passes through the third heat exchanger 82 and the second heat exchanger 80 countercurrently to the contents of the conduit 84. The conduit means 74 passes through the second heat exchanger 80 and the first heat exchanger 78 countercurrently to the contents of the conduit means 84. The conduit means 64 leading from the lower portion of the second vessel 54 passes through the first heat exchanger 78 countercurrently to the contents of the conduit means 84.

In a further preferred embodiment of the invention, a portion of the energy given up by the expanders 44 and 70 can be recaptured with the following apparatus. A compressor 86 is suitably connected through the expander 44 such as by a shaft 88. The conduit means 52, after passing through the third heat exchanger 82, the second heat exchanger 80, and the first heat exchanger 78 connects to the compressor 86. A second compressor 90 is connected to the expander 70 by suitable means such as by shaft 92. The conduit means 74, after passing through the second heat exchanger 80 and the first heat exchanger 78 is connected to the compressor 90. The stream 14 preferably issues from the compressor 90 and results from the compression of the contents of the conduit means 74. As required, an exhaust conduit 94 from the compressor 86 carries the compressed contents from the line 52 to compressor 96 having an external drive 98 for further compression to form the stream 12.

According to certain other aspects of the invention, there is provided a process as follows. An off-gas from a hydroretort means is provided which contains predominantly hydrogen and smaller amounts of methane and ethane and carbon monoxide and inerts, e.g. $N_2$. The stream should have a low water and $CO_2$ content to facilitate processing, hence may require dehydration and $CO_2$ removal by conventional means not shown. Such a stream is carried by the conduit means 10. The off-gas stream is introduced into a separation means which is connected to the hydroretort means to separate the off-gas stream into a high purity hydrogen first stream, a low BTU gas second stream containing carbon monoxide, and a high BTU predominantly hydrocarbon third stream containing predominantly $C_1$ to $C_4$ hydrocarbons and a small amount of carbon monoxide. The means 42 can constitute a suitable separation means. The stream 12 can carry the high purity hydrogen stream. The stream 14 can correspond to the low BTU gas stream. The stream 16 can carry high BTU gas. The high BTU gas stream is fed from the separation means to a reformer means connected thereto to be reformed into hydrogen to provide makeup hydrogen for the hydroretort. A suitable reformer is represented by the zone 8 for example. The reformer 8 can be coupled to the hydroretort by the lines 22 and 40 for example. Suitable off-gas streams from the hydroretort will generally contain carbon monoxide in the range of from about 1 to about 10 percent by volume, usually from about 2 to 8 percent by volume. The high purity hydrogen stream will generally contain in the range from 90 to 100 percent by volume hydrogen, usually in the range from about 95 to about 99.8 percent by volume hydrogen. By low BTU gas stream is meant a gas stream having a BTU value in the range of from about 80 to about 800 British thermal units per standard cubic foot, BTU/SCF (lower heating value). The BTU value of this stream will generally be reduced by carbon monoxide and hydrogen. Usually the low BTU gas stream in the present invention will contain carbon monoxide in the range of from about 10 to about 50 volume percent, usually in the range of from 20 to 40 volume percent. It will also contain most of the inert gases, if present. The high BTU gas stream in accordance with the present invention will generally have a BTU value in excess of 800 BTU/SCF. Such a gas stream will contain predominantly hydrocarbons. Usually, the high BTU gas stream will contain from 95 to 99 volume percent hydrocarbon and only minor amounts of carbon monoxide and/or hydrogen, such as from 1 to about 5 percent by volume carbon monoxide.

In a still further aspect of the present invention, there is provided a process for separating components from a dehydrated, low purity hydrogen gas first stream. The first stream is cooled in a suitable means to provide a high purity hydrogen-containing gas phase and a carbon monoxide enriched hydrogen-lean liquid phase. An expander can be incorporated into the means for cooling the first stream for reducing the pressure of the first stream and further cooling it to a temperature sufficiently low to divide the first stream into a gaseous second stream containing a higher concentration of molecular hydrogen than the first stream and a liquid third stream containing a lower concentration of molecular hydrogen than the first stream. The expansion supplies the first portion of the cooling required to divide the first stream into the second stream and the third stream. The streams are divided in suitable means for separating the high purity hydrogen gas stream from the CO rich liquid stream such as a vessel in which phase separation can occur.

The second stream is passed in an indirect heat exchange relationship with the first stream to provide a second portion of the cooling required to divide the first stream into the second stream and the third stream.

The third stream is passed into indirect heat exchange relationship with the first stream to provide a third portion of the cooling required to divide the first stream into the second stream and the third stream. The third stream thereby becomes heated sufficiently so that it can be divided into a gaseous low BTU fourth stream and a liquid high BTU fifth stream in a means for separating the third stream into a low BTU gas stream and a high BTU liquid stream such as a vessel in which phase separation can occur. Preferably, the third stream is passed in countercurrent indirect heat exchange relationship with the first stream. The low BTU gas fourth stream can be conveyed to an expander via suitable conduit means so as to be reduced in pressure and cooled. The low BTU gas fourth stream can then be passed into indirect heat exchange relationship with the first gas stream to provide a fourth portion of the cooling required to separate the first gas stream into the second stream and third stream. Preferably, the fourth stream is passed into indirect countercurrent heat exchange relationship with the first stream. The fifth stream is passed into indirect heat exchange relationship with the first stream to provide a fifth portion of the cooling required to separate the first stream into the second stream and the third stream. Preferably, the fifth passes countercurrently through the means for cooling the first gas stream and can be introduced into the reformer means to be converted therein from a high BTU liquid stream into a high purity hydrogen stream which can then be fed to a hydroretort. In a preferred embodiment the first stream is cooled by indirect heat exchange in a first zone, a second zone, and a third zone. The second portion of the cooling is provided in the first zone, the second zone, and third zone. The third portion of cooling is provided in the second zone and the third zone. The fourth portion of cooling is provided in the first zone and in the second zone. The fifth portion of cooling is provided in the first zone.

Generally speaking, the first stream will contain in excess of 90 percent by volume hydrogen and moderate amounts of $C_1$ through $C_4$ hydrocarbon and carbon monoxide. The second stream will preferably contain in excess of 95 percent of the hydrogen contained in the first stream and will usually have a hydrogen concentration in excess of 95 volume percent. The fourth stream will usually contain in excess of 50% by volume of $C_1$ hydrocarbon and significant amounts of carbon monoxide such as in the range of 10–50% by volume. The fifth stream will usually contain in excess of 95% by volume $C_1$ through $C_3$ hydrocarbons and a small amount of carbon monoxide such as in the range of 0.1 to 5 volume %.

Where the first stream is from a hydroretort, it will usually be at a pressure in the range of from about 250 to about 2500 pounds per square inch, and frequently be at a temperature in the range of from about 50 to about 250° F. The stream will contain relatively pure hydrogen such as hydrogen at a concentration within the range from about 90 to 99 percent by volume. Minor amounts of other materials will usually be present in the first stream, such as from 1 to about 10 percent by volume carbon monoxide and from 1 to about 10 percent by volume $C_1$ hydrocarbon.

To further recover energy given off by expansion of the first gas stream, the second stream can be compressed in a compressor powered by the expander after the second stream is passed through an indirect heat exchange relationship with a first stream. Similarly, the fourth stream can be compressed utilizing the energy given off by the expander after passage through indirect heat exchange relationship with first stream.

The invention is illustrated by the following example:

Calculated Example

Table I below shows the material balance for the separation process illustrated in FIG. 1.

TABLE I

| Component | Feed (10) | $H_2$ (12) | Low BTU (14) | High BTU (16) |
|---|---|---|---|---|
| | | Mols/Hr | | |
| $H_2$ | 191,412 | 191,402 | 10 | 0 |
| CO | 7,040 | 5,404 | 1,445 | 191 |
| $C_1$ | 5,647 | 214 | 3,530 | 1,903 |
| $C_2^=$ | 131 | 0 | 26 | 105 |
| $C_2$ | 1,555 | 1 | 183 | 1,371 |
| $C_3^=$ | 411 | 0 | 10 | 401 |
| $C_3$ | 586 | 0 | 12 | 574 |
| $C_4^=$ | 272 | 0 | 2 | 270 |
| $NC_4$ | 404 | 0 | 2 | 402 |
| Total | 207,458 | 197,021 | 5,220 | 5,217 |

Table II below calculated temperatures and pressures for the noted streams of the Figure.

TABLE II

| Stream | °F. | Psia | Stream | °F. | Psia |
|---|---|---|---|---|---|
| 101 | 100 | 650 | 112 | 81 | 375 |
| 102 | −91 | 646 | 113 | −325 | 300 |
| 103 | −192 | 643 | 114 | −322 | 385 |
| 104 | −298 | 640 | 115 | −203 | 382 |
| 105 | −325 | 300 | 116 | −103 | 380 |
| 106 | −325 | 300 | 117 | −103 | 380 |
| 107 | −203 | 297 | 118 | −203 | 50 |
| 108 | −103 | 294 | 119 | −103 | 45 |
| 109 | 81 | 290 | 120 | 81 | 40 |
| 110 | 131 | 360 | 121 | 184 | 85 |
| 111 | 312 | 715 | 122 | −103 | 380 |

What is claimed is:

1. A process comprising:
providing a dry, relatively low purity hydrogen gas first stream;
cooling said first stream by indirect heat exchange to form a first cooled stream;
cooling said first cooled stream by expansion to form a first cooled expanded stream;
dividing said first cooled expanded stream into a gaseous second stream comprising a higher concentration of molecular hydrogen than the first stream and a liquid third stream comprising a lower concentration of molecular hydrogen than the first stream, said expansion supplying a first portion of the cooling required to divide the first stream into the second stream and the third stream;
passing the gaseous second stream into indirect heat exchange relationship with the first stream to provide a second portion of the cooling required to divide said first stream into said gaseous second stream and said liquid third stream, thus heating the gaseous second stream and forming a second heated stream;
passing said liquid third stream into indirect heat exchange relationship with said first stream to provide a third portion of the cooling required to divide said first stream into said gaseous second stream and said liquid third stream, thus heating the liquid third stream and forming a third heated stream;
dividing said third heated stream into a gaseous fourth stream and a liquid fifth stream;
cooling the gaseous fourth stream by expansion to form a fourth cooled stream;
passing the fourth cooled stream into indirect heat exchange relationship with the first stream to provide a fourth portion of the cooling required to divide said first stream into said gaseous second stream and said liquid third stream; and
passing the liquid fifth stream into indirect heat exchange relationship with the first stream to provide a fifth portion of the cooling required to separate said first stream into said gaseous second stream and said liquid third stream.

2. A process as in claim 1 wherein the first stream is cooled by indirect heat exchange in a first zone, a second zone, and a third zone;
wherein the second portion of the cooling is provided in the first zone, the second zone, and the third zone;
wherein the third portion of cooling is provided in the second zone and the third zone;
wherein the fourth portion of cooling is provided in the first zone and in the second zone; and
wherein the fifth portion of cooling is provided in the first zone.

3. A process as in claim 1 wherein the first stream contains minor amounts of $C_1$ through $C_4$ hydrocarbons and carbon monoxide and in excess of 90% by volume hydrogen;

wherein the second stream contains in excess of 95% of the hydrogen contained in the first stream and has a hydrogen concentration in excess of 95 vol. %;

wherein the fourth stream contains carbon monoxide and in excess of 50% by volume $C_1$ hydrocarbon; and wherein the fifth stream contains in excess of 75% by volume $C_1$ through $C_3$ hydrocarbon.

4. A process as in claim 3 wherein the first stream is formed from a portion of an effluent stream from a retort for the retorting of carbonaceous materials in the presence of added hydrogen.

5. A process as in claim 4 wherein the first stream has a pressure in the range of from 250 to 2500 lbs/sq inch gauge and a temperature in the range of from about 50° to about 250° F. and contains in the range of 90 to 99% by volume molecular hydrogen, 1 to 10% by volume carbon monoxide and 1 to 10% by volume $C_1$ hydrocarbon and small amounts of $C_2+$ hydrocarbons.

6. A process as in claim 5 further comprising compressing the second stream after passage of said second stream into indirect heat exchange relationship with the first stream using a compressor driven by the expansion of the first stream.

7. A process as in claim 6 further compressing the fourth stream after passage of the fourth stream into indirect heat exchange relationship with the first stream using a compressor driven by the expansion of the fourth stream.

8. A process as in claim 1, wherein the first stream is from a retort and wherein the fifth stream is heated by said indirect heat exchange with the first stream to form a fifth heated stream, said process further comprising: passing the fifth heated stream into a reformer to provide hydrogen for the retort; and passing the second heated stream to the retort.

9. Apparatus comprising:
 a. a means for passing fluids in indirect heat exchange relationship;
 b. a first expander means for reducing the pressure on a fluid;
 c. a first conduit means connecting the means for passing fluids in indirect heat exchange relationship with the first expander means;
 d. a first vessel to provide for the phase separation of a liquid and a gas;
 e. a second conduit means connecting the first expander means with the first vessel;
 f. a third conduit means connecting an upper portion of the first vessel with the means for passing fluids in indirect heat exchange relationship;
 g. a second vessel for phase separating a liquid and a gas;
 h. a fourth conduit means connecting a lower portion of the first vessel with the second vessel, said third conduit means passing through the means for passing fluids in indirect heat exchange relationship;
 i. a fifth conduit means connected to a lower portion of the second vessel, said fifth conduit means passing through a portion of the means for passing fluids in indirect heat exchange relationship;
 j. a second expander means for reducing the pressure on a fluid;
 k. a sixth conduit means connecting an upper portion of the second vessel with the second expander; and
 l. a seventh conduit means connected to the second expander, said seventh conduit means passing through a portion of the means for passing fluids in indirect heat exchange relationship.

10. Apparatus as in claim 9 wherein the means for passing fluids in indirect heat exchange relationship comprises a first heat exchanger, a second heat exchanger, and a third heat exchanger; wherein an eighth conduit means passes through the first heat exchanger, the second heat exchanger and the third heat exchanger and is connected to the first expander; wherein the third conduit means connected to the upper portion of the first vessel passes through the third heat exchanger, the second heat exchanger, and the first heat exchanger; wherein the fourth conduit means connected to the first vessel passes through the third heat exchanger and the second heat exchanger; wherein the seventh conduit means connected to the second expander passes through the second heat exchanger and the first heat exchanger; and wherein the fifth conduit means connected to the second vessel passes through the first heat exchanger.

11. Apparatus as in claim 10 further comprising a first compressor and a shaft connecting the first compressor with the first expander, wherein the third conduit means connected to the first vessel is connected to the first compressor after passing through the third, second, and first heat exchangers; a second compressor and a shaft connecting the second compressor with the second expander, wherein the seventh conduit means connected to the second expander is connected to the second compressor after passing through the second heat exchanger and the first heat exchanger.

* * * * *